(12) United States Patent
Kanda et al.

(10) Patent No.: US 10,012,285 B2
(45) Date of Patent: Jul. 3, 2018

(54) RECIPROCAL ROTATION MECHANISM OF ENGINE

(71) Applicant: MAZDA MOTOR CORPORATION, Hiroshima (JP)

(72) Inventors: Yasunori Kanda, Hiroshima (JP); Tsunehiro Mori, Hiroshima (JP); Masatoshi Nitta, Hiroshima (JP); Yukiyoshi Fukuda, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/023,079

(22) PCT Filed: Aug. 20, 2015

(86) PCT No.: PCT/JP2015/004176
§ 371 (c)(1),
(2) Date: Mar. 18, 2016

(87) PCT Pub. No.: WO2016/051648
PCT Pub. Date: Apr. 7, 2016

(65) Prior Publication Data
US 2016/0298718 A1      Oct. 13, 2016

(30) Foreign Application Priority Data

Sep. 29, 2014   (JP) ................. 2014-198537

(51) Int. Cl.
| | |
|---|---|
| *F16F 15/02* | (2006.01) |
| *F02F 3/00* | (2006.01) |
| *F16C 7/02* | (2006.01) |
| *F16J 1/14* | (2006.01) |

(52) U.S. Cl.
CPC ............. *F16F 15/02* (2013.01); *F02F 3/00* (2013.01); *F16C 7/023* (2013.01); *F16J 1/14* (2013.01)

(58) Field of Classification Search
CPC .... F16F 15/02; F16C 7/023; F16J 1/14; F02F 3/00
See application file for complete search history.

(56) References Cited

U.S. PATENT DOCUMENTS 3,058,792 A * 10/1962 Elford ................. F16J 1/04
403/155
2009/0038577 A1   2/2009   Schneider et al.

FOREIGN PATENT DOCUMENTS

| JP | S62-163365 U | 10/1987 |
| JP | H04-091352 A | 3/1992 |
| JP | H04-119239 A | 4/1992 |
| JP | H11-082468 A | 3/1999 |
| JP | 2004-116682 A | 4/2004 |
| JP | 2009-254163 A | 10/2009 |

(Continued)

OTHER PUBLICATIONS

International Search Report of PCT/JP2015/004176 dated Oct. 27, 2015; English language translation.

(Continued)

*Primary Examiner* — Kevin A Lathers
(74) *Attorney, Agent, or Firm* — Studebaker & Brackett PC

(57) ABSTRACT

In order to reduce bending vibration of a connecting rod, a dynamic absorber (50) configured to reduce the bending vibration of the connecting rod (10) is provided on a piston (1).

5 Claims, 15 Drawing Sheets

(56) References Cited

FOREIGN PATENT DOCUMENTS

JP        2010-535994 A    11/2010

OTHER PUBLICATIONS

International Search Report of PCT/JP2015/004176 dated Oct. 27, 2015.
Written Opinion of PCT/JP2015/004176 dated Oct. 27, 2015.
Masaya Otsuka, "How to Minimize Diesel Combustion Noise by Improving Engine Structure," Proceedings published by Society of Automotive Engineers of Japan, No. 36-05, Society of Automotive Engineers of Japan, May 2005, p. 7-10.

* cited by examiner

PIN CENTER AXIS DIRECTION
(ROD THICKNESS DIRECTION)

RECIPROCAL ROTATION MECHANISM OF ENGINE

TECHNICAL FIELD

The technique disclosed in the present specification relates to a reciprocal rotation mechanism of an engine, the reciprocal rotation mechanism including a piston configured to reciprocate in a cylinder and a connecting rod configured to connect between the piston and a crank shaft. The connecting rod includes a large end portion formed with a shaft insertion hole into which the crank shaft is inserted, a small end portion formed with a pin insertion hole into which a piston pin for connection of the piston is inserted, and a connecting portion connecting between both end portions.

BACKGROUND ART

Typically in an engine mounted on a vehicle such as an automobile, a piston is connected to a small end portion as one end portion of a connecting rod via a piston pin, and a large end portion as the other end portion of the connecting rod is connected to a crank shaft. The small and large end portions of the connecting rod are connected together via a connecting portion of the connecting rod. Reciprocation of the piston is transmitted to the crank shaft via the connecting rod, thereby rotating the crank shaft.

It has been known that in the above-described engine, combustion noise is caused due to resonance determined by the basic structure of the engine (see, e.g., Non-Patent Document 1). Fast combustion made at a diesel engine or an engine capable of performing homogeneous-charge compression-ignition combustion (HCCI) amplifies vibration with a frequency of 1 kHz to 2 kHz and vibration with a frequency of 3 kHz to 4 kHz, resulting in knocking sound. In Non-Patent Document 1, engine sound has three peaks of 1.7 kHz, 3.3 kHz, and 6 kHz.

One (3.3 kHz) of these peaks is caused due to extension/contraction resonance of the connecting rod. That is, in the spring mass model including the piston and the connecting rod, the piston, the piston pin, and the small end portion of the connecting rod correspond, as a whole, to a mass point, and the connecting portion of the connecting rod corresponds to a spring supporting the mass point. With this configuration, when the piston, the piston pin, and the small end portion of the connecting rod are regarded as an integrated portion, such an integrated portion resonates on the large end portion of the connecting rod. Such resonance corresponds to the extension/contraction resonance of the connecting rod as described in Non-Patent Document 1. The following technique for reducing the extension/contraction resonance has been filed as an application (Japanese Patent Application No. 2012-189134) by the applicant of the present invention: a dynamic absorber is provided in a piston pin to suppress a piston, the piston pin, and a small end portion of a connecting rod from resonating together.

On the other hand, the inventor(s) of the present invention has made the following assumption regarding the vibration with a frequency of 1 kHz to 2 kHz. The piston, the piston pin, and the connecting rod correspond, as a whole, to a mass point in the spring mass model including the piston, the connecting rod, and the crank shaft. Extension/contraction is made between the crank shaft and the large end portion of the connecting rod, and therefore, the portion between the crank shaft and the connecting rod corresponds to a spring. However, there has been no countermeasure against such resonance. Due to improvement of the extension/contraction resonance (3.3 kHz) of the connecting rod, the resonance with a frequency of 1 kHz to 2 kHz becomes more noticeable. Another countermeasure against such resonance is required.

Patent Document 1 discloses the following structure. In an annular washer which is fitted onto a leg portion of a bolt screwed into a connecting rod and which is fastened and fixed to the connecting rod via the bolt, a housing space closed from an external space is formed inside the washer. In the housing space, a separate mass member is housed and disposed so as to independently displace in a non-bonded state. Thus, the separate mass member directly and elastically contacts an inner surface of the housing space.

CITATION LIST

Patent Document

PATENT DOCUMENT 1: Japanese Unexamined Patent Publication No. 2004-116682

Non-Patent Document

NON-PATENT DOCUMENT 1: Masaya Otsuka, "Method for Reducing Diesel Combustion Noise in Engine Structure," Proceedings published by Society of Automotive Engineers of Japan, No. 36-05, Society of Automotive Engineers of Japan, May 2005, p. 7-10

SUMMARY OF THE INVENTION

Technical Problem

As a result of intensive study on the spring mass model including the piston and the connecting rod, the inventor(s) of the present invention have found that while the engine is operating, bending vibration of the connecting rod is accompanied by vibration of the piston in a connecting rod longitudinal direction.

However, in the structure of Patent Document 1, such bending vibration of the connecting rod cannot be reduced.

The technique disclosed in the present specification has been made in view of the above-described point, and is intended to reduce bending vibration of a connecting rod.

Solution to the Problem

In order to accomplish the above-described goal, a dynamic absorber configured to reduce bending vibration of a connecting rod is provided on a piston or a connecting rod according to the technique disclosed in the present specification.

Specifically, the technique disclosed in the present specification is intended for a reciprocal rotation mechanism of an engine including a piston configured to reciprocate in a cylinder, and a connecting rod configured to connect between the piston and a crank shaft, the connecting rod including a large end portion formed with a shaft insertion hole into which the crank shaft is inserted, a small end portion formed with a pin insertion hole into which a piston pin for connection of the piston is inserted, and a connecting portion configured to connect both of the large end portion and the small end portion. The following solution has been made.

That is, the technique disclosed in the present specification further includes a dynamic absorber provided on the piston or the connecting rod to reduce bending vibration of the connecting rod.

According to such a technique, since the dynamic absorber configured to reduce the bending vibration of the connecting rod is provided on the piston or the connecting rod, the bending vibration of the connecting rod can be reduced.

A boss portion formed with a pin support hole at which the piston pin is supported is preferably formed at each end portion of the piston in the center axis direction of the piston pin, and the dynamic absorber is preferably provided on the outer surface of each boss portion in the center axis direction of the piston pin.

According to such a configuration, since the dynamic absorber is provided on the outer surface of each boss portion of the piston in the center axis direction of the piston pin, the outer space of each boss portion of the piston in the center axis direction of the piston pin is effectively utilized, and the dynamic absorber can be compactly disposed.

Moreover, since the dynamic absorber is provided on the outer surface of each boss portion of the piston in the center axis direction of the piston pin, bending vibration (particularly, vibration with about 1.2 kHz) of the connecting rod in the thickness direction thereof can be reduced.

With the above-described configuration, the dynamic absorber can be compactly disposed, and the bending vibration of the connecting rod in the thickness direction thereof can be reduced.

The dynamic absorber is preferably provided on a side surface of the connecting portion in the thickness direction of the connecting rod.

According to such a configuration, since the dynamic absorber is provided on the side surface of the connecting portion of the connecting rod in the thickness direction thereof, the bending vibration (particularly, the vibration with about 1.2 kHz) of the connecting rod in the thickness direction thereof can be reduced.

The dynamic absorber is preferably provided on a side surface of the connecting portion in the transverse direction of the connecting rod.

According to such a configuration, since the dynamic absorber is provided on the side surface of the connecting portion of the connecting rod in the transverse direction thereof, bending vibration (particularly, vibration with about 1.3 kHz or vibration with about 2.4 kHz) of the connecting rod in the transverse direction thereof can be reduced.

Advantages of the Invention

According to the technique disclosed in the present specification, the bending vibration of the connecting rod can be reduced.

DESCRIPTION OF EMBODIMENTS

Example embodiments will be described below in detail with reference to drawings.

First Example Embodiment

Figure 1:
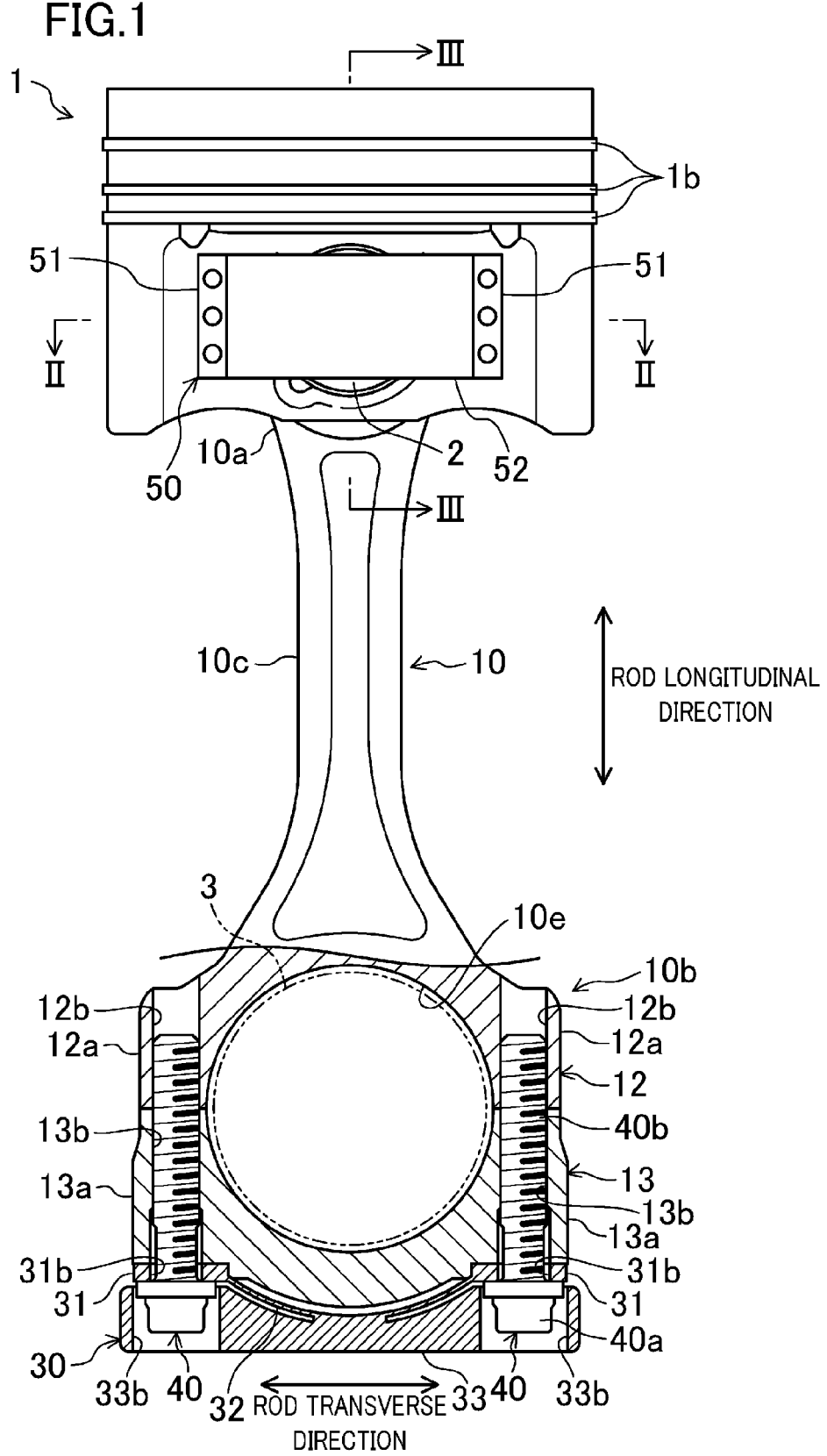
FIG. 1 is a view of a piston and a connecting rod in an engine employing a reciprocal rotation mechanism of a first example embodiment.
Figure 2:
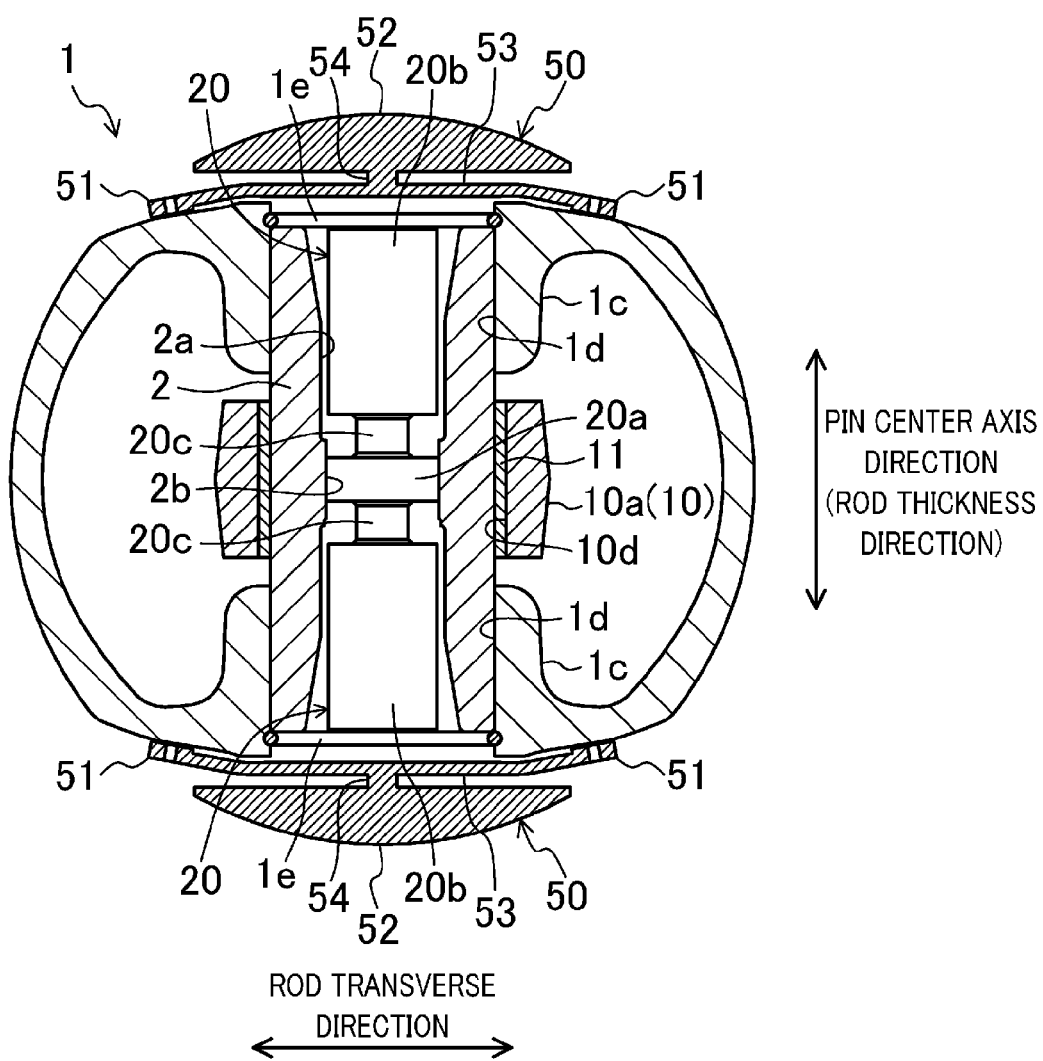
FIG. 2 is a cross-sectional view along an II-II line of FIG. 1.
Figure 3:
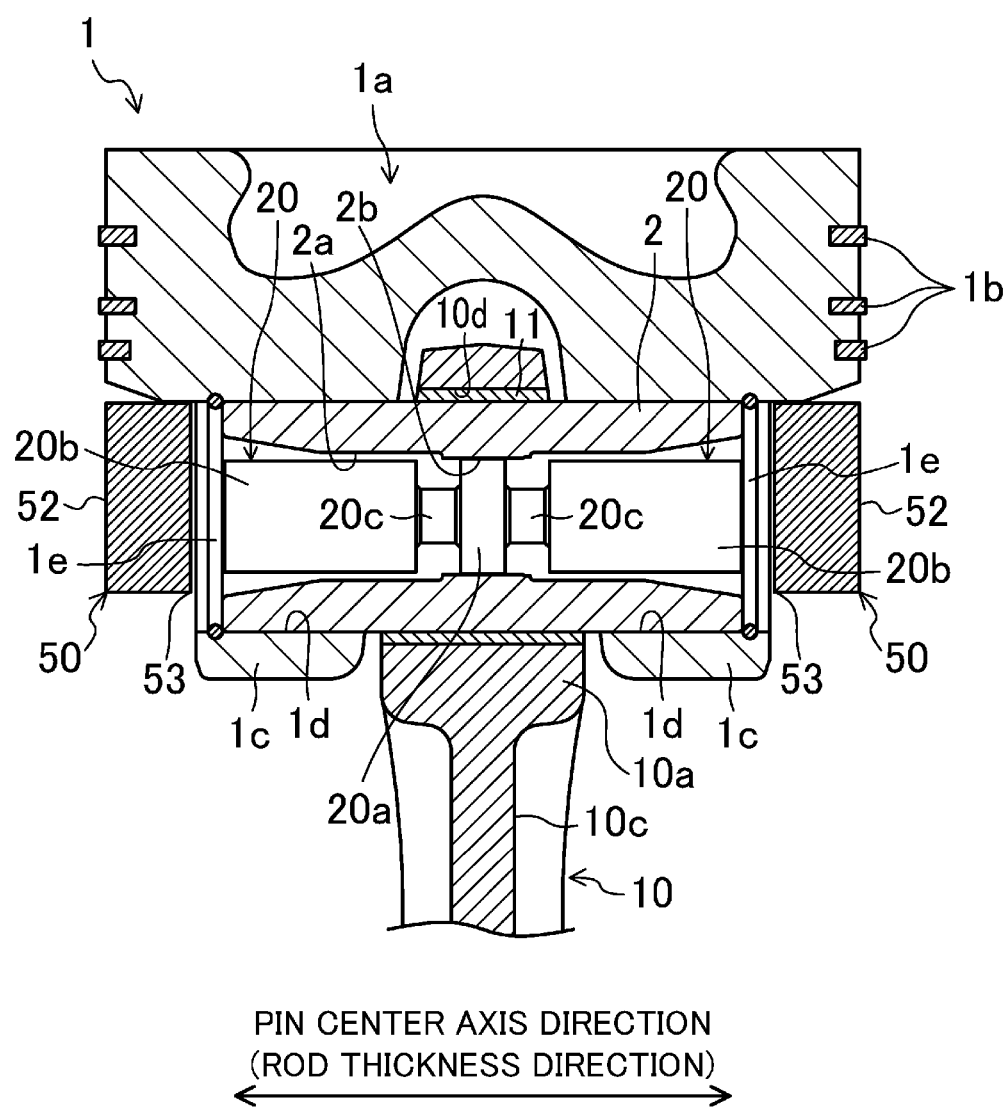
FIG. 3 is a cross-sectional view along an line of FIG. 1.

FIGS. 1 to 3 illustrate a piston 1 and a connecting rod 10 in an engine employing a reciprocal rotation mechanism of a first example embodiment. The piston 1 is configured to repeat a cylinder cycle (including an intake stroke, a compression stroke, a combustion stroke (an expansion stroke), and an exhaust stroke) to reciprocate in the axial direction thereof (the vertical direction as viewed in FIGS. 1 and 3) in the cylinder.

The piston 1 is connected to a small end portion 10a as one end portion of the connecting rod 10 via a piston pin 2. A large end portion 10b as the other end portion of the connecting rod 10 is connected to a crank shaft 3 indicated by a virtual line in FIG. 1. The small end portion 10a and the large end portion 10b of the connecting rod 10 are connected together via a connecting portion 10c. Reciprocation of the piston 1 is transmitted to the crank shaft 3 via the connecting rod 10, thereby rotating the crank shaft 3. The center axis direction (the right-left direction as viewed in FIG. 3) of the piston pin 2 is coincident with the axial direction of the crank shaft 3 and the thickness direction of the connecting rod 10. In the description made below, the center axis direction of the piston pin 2 is referred to as a "pin center axis direction," the longitudinal direction of the connecting rod 10 is referred to as a "rod longitudinal direction," the transverse direction of the connecting rod 10 perpendicular to the rod longitudinal direction and the axial direction of the crank shaft 3 is referred to as a "rod transverse direction," and the thickness direction of the connecting rod 10 coincident with the pin center axis direction is referred to as a "rod thickness direction." Moreover, FIG. 1 illustrates a cross section of the periphery of the large end portion 10b of the connecting rod 10 along the plane parallel to the rod transverse direction.

A pin insertion hole 10d into which the piston pin 2 is inserted is formed at the small end portion 10a of the connecting rod 10. A shaft insertion hole 10e into which the crank shaft 3 is inserted is formed at the large end portion 10b of the connecting rod 10.

The piston pin 2 is inserted into the pin insertion hole 10d of the small end portion 10a of the connecting rod 10, and the small end portion 10a of the connecting rod 10 is positioned in the middle of the piston pin 2 in the center axis direction thereof. Moreover, the small end portion 10a of the connecting rod 10 is positioned in the middle of the piston 1 in the pin center axis direction.

The piston pin 2 is rotatably inserted into the pin insertion hole 10d of the connecting rod 10. Note that a bush 11 is fixed to an inner peripheral surface of the pin insertion hole 10d of the connecting rod 10. Strictly speaking, the piston pin 2 is rotatably inserted into the bush 11.

Lubricant oil circulating in the engine is supplied to form a lubricant oil film between the piston pin 2 and the pin insertion hole 10d of the connecting rod 10 (specifically, the bush 11). The lubricant oil film and the bush 11 allows the piston pin 2 to smoothly rotate on the pin insertion hole 10d of the connecting rod 10.

A cavity 1a is formed at a top surface of the piston 1, and annular piston rings 1b are fitted onto an outer peripheral surface of the piston 1 on the upper side with respect to the piston pin 2.

At both end portions of a back surface (the surface opposite to the top surface) of the piston 1 in the pin center axis direction, boss portions 1c are formed so as to sandwich the small end portion 10a of the connecting rod 10 and to protrude toward the crank shaft 3. The boss portions 1c form pin support holes 1d extending in the pin center axis direction. Both end portions of the piston pin 2 in the center axis direction thereof are inserted respectively into the pin support holes 1d of the boss portions 1c, and are supported by the pin support holes 1d of the boss portions 1c.

In the present embodiment, a full floating method is employed as the method for attaching the piston pin 2. That is, the piston pin 2 is rotatable on the pin insertion hole 10d of the connecting rod 10, and is also rotatable on the pin support holes 1d of the boss portions 1c of the piston 1.

As in the lubricant oil film between the piston pin 2 and the pin insertion hole 10d of the connecting rod 10, a lubricant oil film is also formed between the piston pin 2 and each pin support hole 1d of the boss portions 1c of the piston 1. Such a lubricant oil film allows the piston pin 2 to smoothly rotate on each pin support hole 1d of the boss portions 1c of the piston 1.

A snap ring 1e is inserted and fixed to each outer end portion of the pin support holes 1d of the boss portions 1c in the pin center axis direction. Each snap ring 1e is positioned so as to contact a corresponding one of end surfaces of the piston pin 2 in the center axis direction thereof, and therefore, restricts movement of the piston pin 2 in the center axis direction thereof.

The piston pin 2 has a hollow cross section, and a through-hole 2a extending in the pin center axis direction is formed at the center of the piston pin 2. A press-fit portion 2b into which fixed portions 20a of later-described pin dampers 20 are press-fitted is provided in the middle of an inner peripheral surface of the through-hole 2a in the pin center axis direction. The inner diameter of the through-hole 2a at the press-fit portion 2b is less than the inner diameter of the through-hole 2a at the other portion.

In the piston pin 2 (the through-hole 2a), two pin dampers 20 are arranged to suppress the piston 1, the piston pin 2, and the small end portion 10a of the connecting rod 10 from integrally resonating on the large end portion 10b of the connecting rod 10 in the combustion stroke. These two pin dampers 20 are positioned respectively on both sides of the plane passing through the middle of the piston pin 2 in the center axis direction thereof (i.e., the plane passing through the middle of the piston pin 2 in the center axis direction thereof and being perpendicular to the center axis of the piston pin 2).

Figure 4:
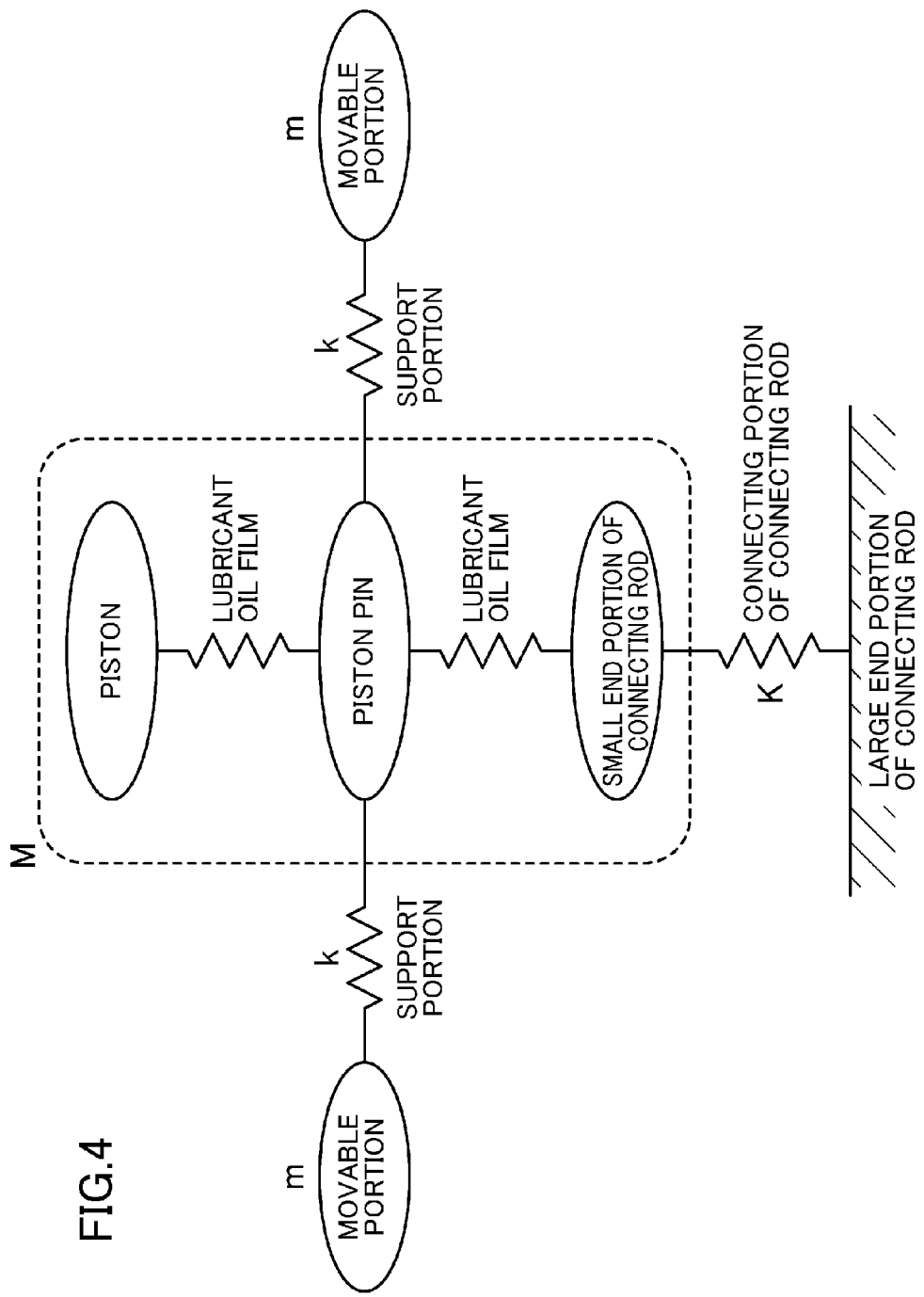
FIG. 4 is a view of the spring mass model including the piston and the connecting rod.

The spring mass model including the piston 1 and the connecting rod 10 is illustrated in FIG. 4. That is, the piston 1, the piston pin 2, and the small end portion 10a of the connecting rod 10 correspond, as a whole, to a mass point (with a mass of M (in units of kg)), and the connecting portion 10c of the connecting rod 10 corresponds to a spring (with a spring constant of K (in units of N/m)) supporting the mass point on the large end portion 10b of the connecting rod 10.

The lubricant oil film between the piston pin 2 and the pin insertion hole 10d of the connecting rod 10 corresponds to a spring connecting between the piston pin 2 and the small end portion 10a of the connecting rod 10. Moreover, the lubricant oil film between the piston pin 2 and each pin support hole 1d of the boss portions 1c of the piston 1 corresponds a spring connecting between the piston pin 2 and the piston 1 (the boss portions 1c).

Since the piston 1 is pressed with great force at the combustion stroke, the lubricant oil film (the spring connecting between the piston pin 2 and the small end portion 10a of the connecting rod 10) between the piston pin 2 and the pin insertion hole 10d of the connecting rod 10 and the lubricant oil film (the spring connecting between the piston pin 2 and the piston 1) between the piston pin 2 and each pin support hole 1d of the boss portions 1c of the piston 1 are both lost. As a result, the piston 1, the piston pin 2, and the small end portion 10a of the connecting rod 10 are integrated together. Thus, the piston 1, the piston pin 2, and the small end portion 10a of the connecting rod 10 integrally resonate on the large end portion 10b of the connecting rod 10 with a resonance frequency of $(1/2\pi) \cdot (K/M)^{1/2}$ Hz.

In order to reduce such resonance (reduce vibration with the resonance frequency), the pin dampers 20 are provided in the piston pin 2 (the through-hole 2a). As illustrated in FIGS. 2 and 3, each pin damper 20 includes the fixed portion 20a fixed to the press-fit portion 2b provided on the inner peripheral surface of the through-hole 2a of the piston pin 2, a movable portion 20b extending in the pin center axis direction in the piston pin 2, and a support 20c supporting the movable portion 20b on the fixed portion 20a so that the movable portion 20b can vibrate in the radial direction of the piston pin 2.

In the present embodiment, the fixed portion 20a, the movable portion 20b, and the support 20c of each pin damper 20 are integrally made of metal. The fixed portions 20a of the pin dampers 20 are integrally formed such that the fixed portions 20a are formed substantially into a single component. The integrally-formed fixed portion 20a is press-fitted and fixed to the press-fit portion 2b. One of the movable portions 20b of the pin dampers 20 is, via a corresponding one of the supports 20c, provided on one surface of the integrally-formed fixed portion 20a in the pin center axis direction, and the other movable portion 20b of the pin dampers 20 is, via a corresponding one of the supports 20c, provided on the other surface of the integrally-formed fixed portion 20a in the pin center axis direction.

The movable portion 20b of each pin damper 20 is in a cylindrical shape extending in the pin center axis direction. The outer diameter of the movable portion 20b is set at such a value that the movable portion 20b does not contact the inner peripheral surface of the piston pin 2 even when the movable portion 20b vibrates. The support 20c of each pin damper 20 is in such a cylindrical shape that the movable portion 20b and the fixed portion 20a of the pin damper 20 are connected together. The outer diameter of the support 20c is less than the outer diameter of the movable portion 20b, and the support 20c supports the movable portion 20b on the fixed portion 20a so that the movable portion 20b can vibrate in the radial direction of the piston pin 2. The fixed portions 20a, the movable portions 20b, and the supports 20c of the pin dampers 20 are positioned concentric with respect to the piston pin 2. The movable portions 20b of the pin dampers 20 have the substantially same mass. The centers of gravity of the movable portions 20b of the pin dampers 20 are positioned on the center axis of the piston pin 2, and are positioned symmetrically with respect to the plane passing through the middle of the piston pin 2 in the center axis direction thereof (i.e., the plane passing through the middle of the piston pin 2 in the center axis direction thereof and being perpendicular to the center axis of the piston pin 2).

The support 20c of each pin damper 20 corresponds to a spring supporting the movable portion 20b (having a mass of m (in units of kg)). When the spring constant of the support 20c is k (in units of N/m), the value k/m may be basically set at the substantially same value as the value K/M in order to reduce the above-described resonance. The length and diameter of the movable portion 20b and the length and diameter of the support 20c are set such that the above-described value k/m is obtained. Strictly speaking, although the mass of the support 20c should be taken into consideration, the mass of the support 20c is much less than that of the movable portion 20b, and therefore, the mass of the support 20c can be ignored. Note that in the case the intensity of vibration can be increased with a frequency other than the resonance frequency, the value k/m is not necessarily the substantially same as the value K/M.

The movable portions 20b of the pin dampers 20 preferably have the substantially same mass, and the pin dampers 20 (the supports 20c) preferably have different spring constants. This is because not only vibration with the resonance frequency but also vibration with a relatively-broad frequency range including the resonance frequency can be reduced. In order to provide the different spring constants of the pin dampers 20, the lengths or diameters of the supports 20c of the pin dampers 20 may be set different from each other. Alternatively, both of the lengths and diameters of the supports 20c of the pin dampers 20 may be set different from each other. As still another alternative, the materials of the supports 20c of the pin dampers 20 may be set different from each other. Note that the pin dampers 20 may have the substantially same spring constant.

In the case of the different spring constants of the pin dampers 20, the spring constant of one of the pin dampers 20 is set such that the value k/m is substantially equal to the value K/M, and the spring constant of the other pin damper 20 is set greater or less than the spring constant of the one of the pin dampers 20, for example.

As described above, the lubricant oil film (the spring connecting between the piston pin 2 and the small end portion 10a of the connecting rod 10) between the piston pin 2 and the pin insertion hole 10d of the connecting rod 10 and the lubricant oil film (the spring connecting between the piston pin 2 and the piston 1) between the piston pin 2 and each pin support hole 1d of the boss portions 1c of the piston 1 are both lost at the combustion stroke. As a result, the piston 1, the piston pin 2, and the small end portion 10a of the connecting rod 10 are integrated together, and tend to resonate on the large end portion 10b of the connecting rod 10. However, in the present embodiment, such resonance is reduced by the pin dampers 20 provided in the piston pin 2, and noise due to the resonance can be reduced.

On the other hand, the lubricant oil films are present between the piston pin 2 and the pin insertion hole 10d of the connecting rod 10 and between the piston pin 2 and each pin support hole 1d of the boss portions 1c of the piston 1 at the intake stroke, the compression stroke, and the exhaust stroke. As a result, no resonance as in the resonance caused at the combustion stroke is caused. If the pin dampers 20 are provided at the small end portion 10a of the connecting rod 10, the above-described resonance can be reduced at the combustion stroke, but the pin dampers 20 vibrate at the strokes causing no resonance, i.e., the intake stroke, the compression stroke, and the exhaust stroke. For this reason, at the intake stroke, the compression stroke, and the exhaust stroke, noise becomes greater due to vibration of the pin dampers 20. However, in the present embodiment, the pin dampers 20 are provided in the piston pin 2. Thus, at the intake stroke, the compression stroke, and the exhaust stroke, the lubricant oil film (the spring connecting between the piston pin 2 and the small end portion 10a of the connecting rod 10) between the piston pin 2 and the pin insertion hole 10d of the connecting rod 10 prevents transmission of vibration of the pin dampers 20 to the connecting rod 10. Thus, noise does not become greater due to such vibration. Moreover, since the pin dampers 20 are provided in the piston pin 2, a space can be effectively utilized without an increase in the size of the piston 1.

The large end portion 10b of the connecting rod 10 is divided into two portions with respect to the middle of the shaft insertion hole 10e in the rod longitudinal direction. The large end portion 10b of the connecting rod 10 includes a semi-circular body portion 12 integrally formed with the connecting portion 10c, and a semi-circular connecting rod cap 13 disposed on the side (hereinafter referred to as an "opposite connection side") of the body portion 12 opposite to the connecting portion 10c. The connecting rod cap 13 forms a portion of the connecting rod 10 on the opposite connection side, and the outer peripheral edge of the connecting rod cap 13 is in a semi-arc shape along the outer shape of the crank shaft 3. Boss portions 12a, 13a are formed respectively on end portions of the body portion 12 and the connecting rod cap 13 in the rod transverse direction. The boss portions 12a, 13a extend substantially along the rod longitudinal direction. An internal thread is formed at a bolt hole 12b formed at the boss portion 12a of the body portion 12. A bolt 40 (a fastening member) inserted into a bolt insertion hole 13b formed at the boss portion 13a of the connecting rod cap 13 is screwed into the bolt hole 12b, and therefore, the body portion 12 and the connecting rod cap 13 are integrated together.

Figure 5:
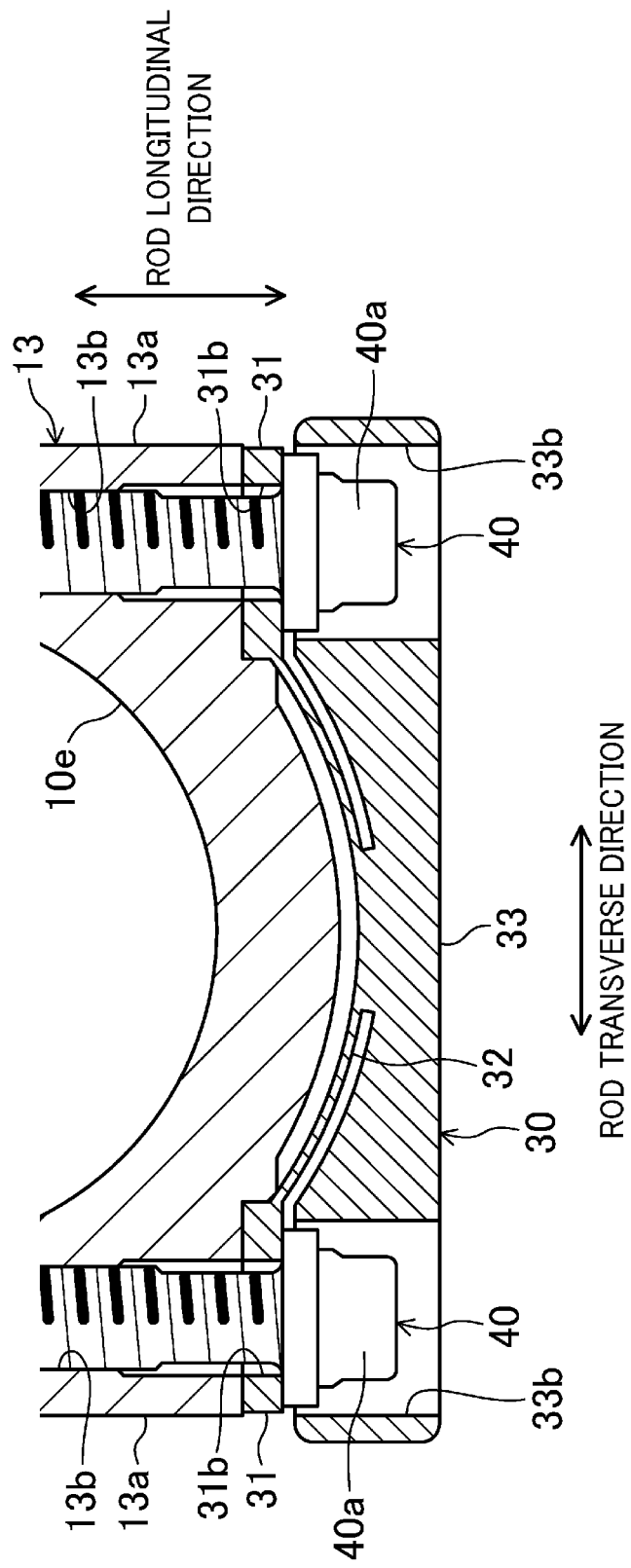
FIG. 5 is an enlarged view of the periphery of a connecting rod cap damper of FIG. 1.
Figure 6:
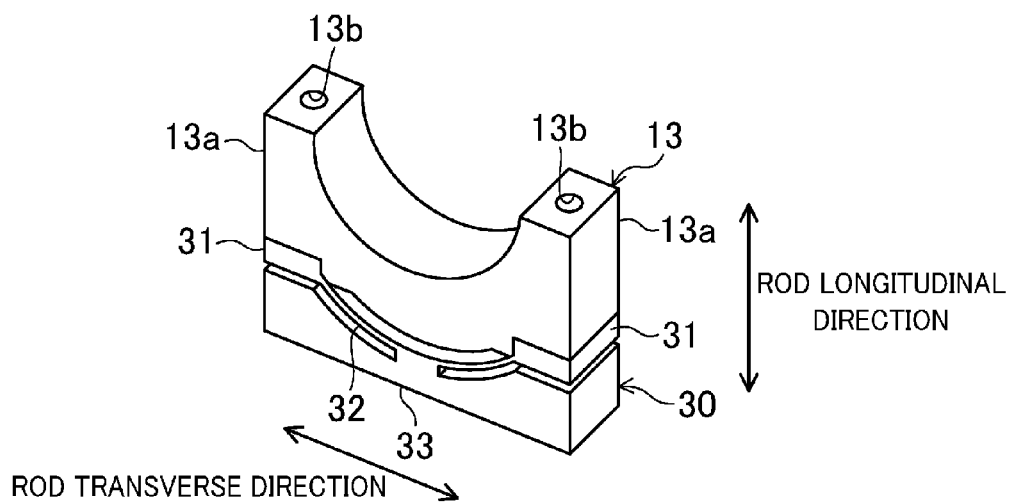
FIG. 6 is a perspective view of the connecting rod cap damper from the connection side of the connecting rod.
Figure 7:
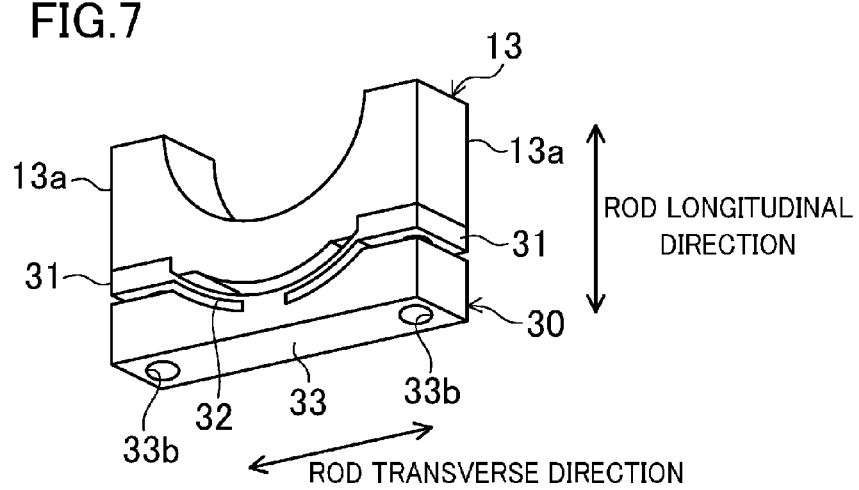
FIG. 7 is a perspective view of the connecting rod cap damper from the opposite connection side of the connecting rod.
Figure 8:
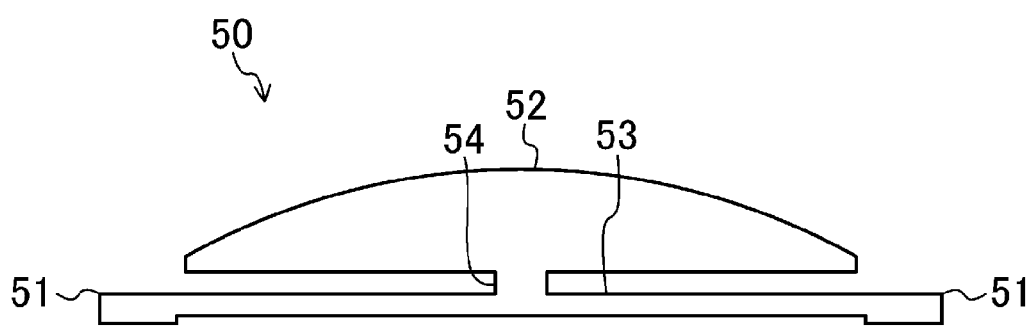
FIG. 8 is a perspective view of a dynamic absorber.

A connecting rod cap damper 30 (a dynamic absorber) as a member separated from the connecting rod cap 13 is disposed on an outer peripheral portion of the connecting rod cap 13 to suppress the piston 1, the piston pin 2, and the connecting rod 10 from integrally resonating on the crank shaft 3. FIG. 5 is an enlarged view of the periphery of the connecting rod cap damper 30 of FIG. 1. Moreover, FIG. 6 is a perspective view of the connecting rod cap damper 30 from the side close to the connecting portion 10c of the connecting rod 10, and FIG. 7 is a perspective view of the connecting rod cap damper 30 from the opposite connection side.

In the spring mass model including the piston 1, the connecting rod 10, and the crank shaft 3, the piston 1, the piston pin 2, and the connecting rod 10 correspond, as a whole, to a mass point. Moreover, extension/contraction is made between the crank shaft 3 and the large end portion 10b of the connecting rod 10, and the portion between the crank shaft 3 and the large end portion 10b of the connecting rod 10 corresponds to a spring. The piston 1, the piston pin 2, and the connecting rod 10 integrally resonate on the crank shaft 3 in the rod longitudinal direction.

In order to reduce such resonance (reduce vibration with the resonance frequency), the connecting rod cap damper 30 is provided on the connecting rod cap 13. The connecting rod cap damper 30 includes a pair of fixed portions 31 fixed respectively to the opposite-connection-side surfaces of the boss portions 13a of the connecting rod cap 13, a support 32 connecting between the fixed portions 31 at the outer peripheral portion of the connecting rod cap 13, and a mass portion 33 connected to the opposite-connection-side end portions of the support 32. The fixed portions 31, the support 32, and the mass portion 33 are integrally made of metal.

Each fixed portion 31 is in a flat plate shape, and at a substantially center portion thereof, a bolt insertion hole 31b coaxial with the bolt insertion hole 13b of the boss portion 13a of the connecting rod cap 13 is formed to penetrate the fixed portion 31. Each fixed portion 31 and the connecting rod cap 13 are together fastened to the body portion 12 via the bolt 40. Specifically, the bolt insertion hole 31b of the fixed portion 31 is formed to have a smaller diameter than that of a head portion 40a of the bolt 40. A shaft portion 40b of the bolt 40 is inserted into the bolt insertion hole 31b of the fixed portion 31 from the opposite connection side, and the fixed portion 31 is sandwiched and fixed by the head portion 40a of the bolt 40 and the boss portion 13a of the connecting rod cap 13 in the state in which the shaft portion 40b is screwed into the bolt hole 12b of the body portion 12. As described above, the connecting rod cap damper 30 is fastened and fixed to the body portion 12, using the bolt 40 configured to fix the connecting rod cap 13 to the body portion 12.

The support 32 is formed of a plate thinner than the fixed portion 31, and at the outer peripheral portion of the connecting rod cap 13, forms an arc shape along the outer peripheral edge of the connecting rod cap 13. With this configuration, the support 32 can elastically deform in the rod longitudinal direction. Thus, the support 32 can support the mass portion 33 connected to the opposite-connection-side end portion of the support 32 so that such a mass portion 33 can move in the rod longitudinal direction. Further, since the support 32 is in the arc shape along the outer peripheral edge of the connecting rod cap 13 as described above, the support 32 can be positioned close to the connecting rod cap 13.

The support 32 corresponds to a spring supporting the mass portion 33, and the length and thickness of the support 32 are set such that the above-described resonance is reduced. Strictly speaking, although the mass of the support 32 should be taken into consideration, the mass of the support 32 is much less than that of the mass portion 33, and therefore, the mass of the support 32 can be ignored.

The mass portion 33 is connected to the opposite-connection-side end portion of the support 32 as described above. That is, the mass portion 33 is disposed on the opposite connection side of the connecting rod cap 13 with a distance from the connecting rod cap 13.

The mass portion 33 is in a plate shape having the substantially same width as that of the large end portion 10b of the connecting rod 10 and having a greater thickness than that of the fixed portion 31. In order to suppress the piston 1, the piston pin 2, and the connecting rod 10 from resonating together, the mass of the mass portion 33 is set considering the spring constant of the support 32.

Bolt insertion holes 33b (contact avoiders) each formed coaxial with a corresponding one of the bolt insertion holes 13b of the boss portions 13a of the connecting rod cap 13 are formed to penetrate the mass portion 33. Each bolt insertion hole 33b is formed to have a greater diameter than that of the head portion 40a of the bolt 40. Thus, when the connecting rod cap damper 30 is fastened and fixed to the body portion 12, each bolt 40 is inserted into a corresponding one of the bolt insertion holes 33b of the mass portion 33 from the opposite connection side. At this point, each bolt 40 can penetrate the mass portion 33 without contacting the mass portion 33.

The surface of the mass portion 33 on the opposite connection side extends in the rod transverse direction, and the surface of the mass portion 33 on the side close to the connecting portion 10c extends along the support 32. In other words, the surface of the mass portion 33 on the side close to the connecting portion 10c is in an arc shape along the outer peripheral edge of the connecting rod cap 13. Thus, as in the support 32, the mass portion 33 can be positioned close to the connecting rod cap 13. As a result, the connecting rod cap damper 30 can be downsized.

As described above, the connecting rod 10, the piston 1, and the piston pin 2 tend to integrally resonate on the crank shaft 3 in the rod longitudinal direction. However, in the present embodiment, the mass portion 33 of the connecting rod cap damper 30 provided on the connecting rod cap 13 vibrates in the rod longitudinal direction with the phase substantially opposite to that of vibration of the connecting rod 10. This reduces the above-described resonance, and noise due to the resonance can be reduced.

As illustrated in FIGS. 1 to 3, a dynamic absorber 50 configured to reduce, while the engine is operating, bending vibration (particularly, vibration with a frequency of about 1.2 kHz) of the connecting rod 10 in the rod thickness direction in association with vibration of the piston 1 in the rod longitudinal direction is disposed on the outer surface of each boss portion 1c of the piston 1 in the pin center axis direction. These two dynamic absorbers 50 are positioned symmetrical with respect to the plane passing through the middle of the piston pin 2 in the center axis direction thereof (i.e., the plane passing through the middle of the piston pin 2 in the center axis direction thereof and being perpendicular to the center axis of the piston pin 2).

In the spring mass model including the piston 1 and the connecting rod 10, the piston 1 corresponds to a mass point, and the connecting rod 10 corresponds to a spring supporting the mass point on the crank shaft 3. The piston 1 resonates on the connecting rod 10, and bending vibration of the connecting rod 10 occurs in the rod thickness direction and the rod transverse direction.

In order to reduce such bending vibration of the connecting rod 10 in the rod thickness direction, the dynamic absorbers 50 are provided at the piston 1. As illustrated in FIGS. 1 to 3 and FIG. 8, each dynamic absorber 50 includes a pair of fixed portions 51 each fixed to a corresponding one of the outer surfaces of the boss portions 1c of the piston 1 in the pin center axis direction, a mass portion 52 extending in the rod transverse direction in the vicinity of the outer surfaces of the boss portions 1c of the piston 1 in the pin center axis direction, and a support 53 supporting the mass portion 52 on the fixed portions 51 so that the mass portion 52 can vibrate in the rod thickness direction.

In the present embodiment, the fixed portions 51, the mass portion 52, and the support 53 in each dynamic absorber 50 are integrally made of metal. The fixed portions 51 of each dynamic absorber 50 are provided respectively at both end portions of the support 53 of the dynamic absorber 50 in the rod transverse direction. These two fixed portions 51 are in a rectangular plate shape. The fixed portions 51 are positioned respectively at both end portions in the rod transverse direction on the outer surfaces of the boss portions 1c of the piston 1 in the pin center axis direction. With this configuration, each dynamic absorber 50 is positioned close to the end portion of the connecting rod 10 on the side close to the small end portion 10a, the end portion causing relatively-small bending vibration in the rod thickness direction. The fixed portions 51 are, with a fastening member (not shown), fastened and fixed to the outer surfaces of the boss portions 1c of the piston 1 in the pin center axis direction. The mass portion 52 of each dynamic absorber 50 is provided on the fixed portions 51 via the support 53.

The outer surface of the mass portion 52 of each dynamic absorber 50 in the pin center axis direction is in an arc shape forming the outer peripheral surface of the piston 1. The inner surface of the mass portion 52 in the pin center axis direction is in a linear shape extending in the rod transverse direction. The support 53 of each dynamic absorber 50 is, via a connecting portion 54, provided on the inner surface of the mass portion 52 in the pin center axis direction. That is, a clearance is formed between the inner surface of the mass portion 52 in the pin center axis direction and the outer surface of the support 53 in the pin center axis direction.

The support 53 of each dynamic absorber 50 is in a rectangular plate shape extending in the rod transverse direction to connect between the mass portion 52 and each fixed portion 51 in the dynamic absorber 50. A clearance is formed between the inner surface of the support 53 in the pin center axis direction and each outer surface of the boss portions 1c of the piston 1 in the pin center axis direction. The support 53 supports the mass portion 52 on the fixed portions 51 so that the mass portion 52 can vibrate in the pin center axis direction.

The mass portions 52 of the dynamic absorbers 50 have the substantially same mass. The centers of gravity of the mass portions 52 of the dynamic absorbers 50 are positioned on the center axis of the piston pin 2, and are positioned symmetrically with respect to the plane passing through the middle of the piston pin 2 in the center axis direction thereof (i.e., the plane passing through the middle of the piston pin 2 in the center axis direction thereof and being perpendicular to the center axis of the piston pin 2).

The support 53 of each dynamic absorber 50 corresponds to a spring supporting the mass portion 52. The dimensions of the mass portion 52 and the dimensions of the support 53 are set such that the bending vibration of the connecting rod 10 in the rod thickness direction is reduced. Strictly speaking, although the mass of the support 53 should be taken into consideration, the mass of the support 53 is much less than that of the mass portion 52, and therefore, the mass of the support 53 can be ignored.

The mass portions 52 of the dynamic absorbers 50 preferably have the substantially same mass, and the dynamic absorbers 50 (the supports 53) preferably have different spring constants. This is because not only the above-described bending vibration but also vibration with a relatively-broad frequency range including the frequency of the bending vibration can be reduced. In order to provide the different spring constants of the dynamic absorbers 50, the dimensions of the supports 53 of the dynamic absorbers 50 may be set different from each other. Alternatively, the materials of the supports 53 of the dynamic absorbers 50 may be set different from each other. Note that the dynamic absorbers 50 may have the substantially same spring constant.

As described above, when the piston 1 resonates on the connecting rod 10, the tendency shows that bending vibration of the connecting rod 10 occurs in the rod thickness direction and the rod transverse direction. However, in the present embodiment, the mass portion 52 of each dynamic absorber 50 provided at the piston 1 vibrates in the rod thickness direction with the phase substantially opposite to that of the bending vibration of the connecting rod 10 in the rod thickness direction. This reduces the bending vibration in the rod thickness direction, and noise due to such vibration can be reduced.

Advantageous Effects

As described above, according to the present embodiment, each dynamic absorber 50 is provided on the outer surfaces of the boss portions 1c of the piston 1 in the center axis direction of the piston pin 2. Thus, the outer space of the boss portions 1c of the piston 1 in the center axis direction of the piston pin 2 can be effectively utilized, and each dynamic absorber 50 can be compactly disposed.

Moreover, since each dynamic absorber 50 is provided on the outer surfaces of the boss portions 1c of the piston 1 in the center axis direction of the piston pin 2, the bending vibration (particularly, vibration with about 1.2 kHz) of the connecting rod 10 in the thickness direction thereof can be reduced.

With the above-described configuration, each dynamic absorber 50 can be compactly disposed, and the bending vibration of the connecting rod 10 in the thickness direction thereof can be reduced.

Note that in the present embodiment, two dynamic absorbers 50 are provided, but only one of the dynamic absorbers 50 may be provided. Note that two dynamic absorbers 50 are preferably provided considering, e.g., a weight balance.

Second Example Embodiment

The present embodiment is different from the first example embodiment in that a dynamic absorber 60 is provided on a side surface of a connecting portion 10c of a connecting rod 10 in the rod thickness direction. Other configuration of the present embodiment is similar to that of the first example embodiment. Thus, the same reference numerals as those of the first example embodiment are used to represent equivalent elements in the description made below.

Figure 9:
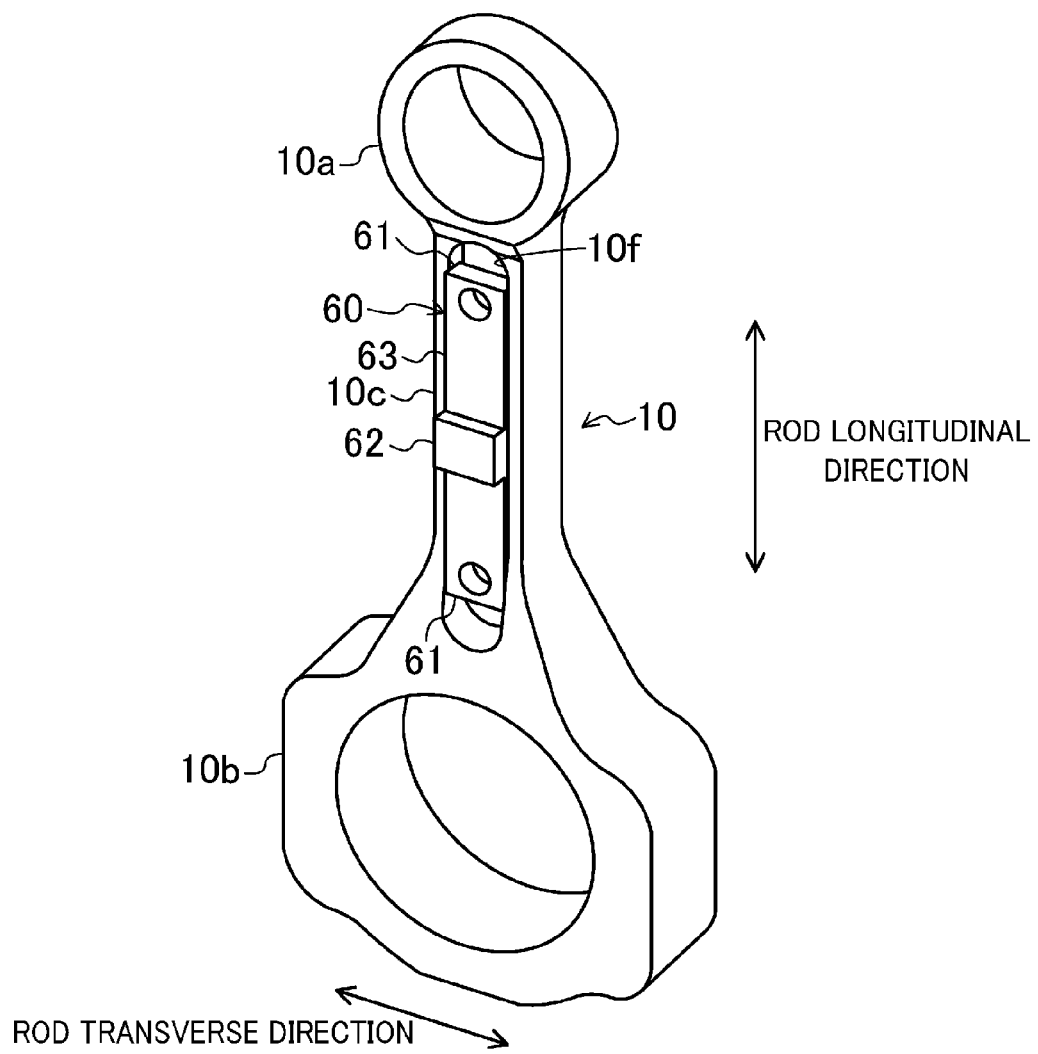
FIG. 9 is a schematic perspective view of a connecting rod in an engine employing a reciprocal rotation mechanism of a second example embodiment.
Figure 10:
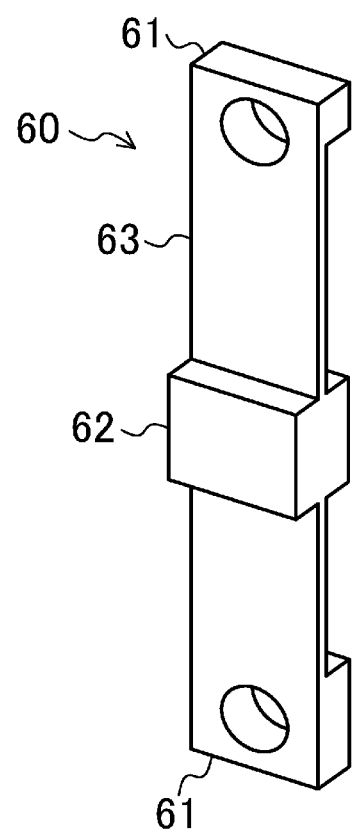
FIG. 10 is a perspective view of a dynamic absorber.

As illustrated in FIGS. 9 and 10, the dynamic absorber 60 configured to reduce, while an engine is operating, bending vibration (particularly, vibration with a frequency of about 1.2 kHz) of the connecting rod 10 in the rod thickness direction in association with vibration of a piston 1 in the rod longitudinal direction is provided on one end surface of the connecting portion 10c of the connecting rod 10 in the rod thickness direction.

The dynamic absorber 60 includes a pair of fixed portions 61 fixed to the one end surface of the connecting portion 10c of the connecting rod 10 in the rod thickness direction, a mass portion 62 provided in the vicinity of the one end surface of the connecting portion 10c of the connecting rod 10 in the rod thickness direction, and a support 63 supporting the mass portion 62 on the fixed portions 61 so that the mass portion 62 can vibrate in the rod thickness direction.

In the present embodiment, the fixed portions 61, the mass portion 62, and the support 63 in the dynamic absorber 60 are integrally made of metal. The fixed portions 61 of the dynamic absorber 60 are provided respectively at both end portions of the support 63 of the dynamic absorber 60 in the rod longitudinal direction. These two fixed portions 61 are in a rectangular parallelepiped shape. The fixed portions 61 are positioned respectively at both end portions (the end portion on the side close to a small end portion 10a of the connecting rod 10 and the end portion on the side close to a large end portion 10b of the connecting rod 10) in the rod longitudinal direction on the one end surface of the connecting portion 10c of the connecting rod 10 in the rod thickness direction. Of the one end surface of the connecting portion 10c of the connecting rod 10 in the rod thickness direction, the end portion on the side close to the small end portion 10a causing relatively-large bending vibration in the rod thickness direction and the end portion on the side close to the large end portion 10b causing relatively-small bending vibration in the rod thickness direction are connected together via the dynamic absorber 60. As a result, the dynamic absorber 60 can be compactly disposed on the connecting portion 10c of the connecting rod 10. The fixed portions 61 are, with a fastening member (not shown), fastened and fixed to a recessed portion 10f formed to extend in the rod longitudinal direction at the one end surface of the connecting portion 10c of the connecting rod 10 in the rod thickness direction. The mass portion 62 of the dynamic absorber 60 is provided on the fixed portions 61 via the support 63.

The mass portion 62 of the dynamic absorber 60 is in a rectangular parallelepiped shape. The support 63 of the dynamic absorber 60 is provided in the middle of the mass portion 62 in the rod thickness direction. A clearance is formed between the inner surface of the mass portion 62 in the rod thickness direction and the bottom surface of the recessed portion 10f at the one end surface of the connecting portion 10c of the connecting rod 10 in the rod thickness direction.

The support 63 of the dynamic absorber 60 is in a rectangular plate shape extending in the rod longitudinal direction to connect between the mass portion 62 and each fixed portion 61 in the dynamic absorber 60. A clearance is formed between the inner surface of the support 63 in the rod thickness direction and the bottom surface of the recessed portion 10f at the one end surface of the connecting portion 10c of the connecting rod 10 in the rod thickness direction. The support 63 supports the mass portion 62 on the fixed portions 61 so that the mass portion 62 can vibrate in the rod thickness direction.

The support 63 of the dynamic absorber 60 corresponds to a spring supporting the mass portion 62. The dimensions of the mass portion 62 and the dimensions of the support 63 are set such that the above-described bending vibration is reduced. Strictly speaking, the mass of the support 63 should be taken into consideration, the mass of the support 63 is much less than that of the mass portion 62, and therefore, the mass of the support 63 can be ignored.

As described above, when the piston 1 resonates on the connecting rod 10, the tendency shows that bending vibration of the connecting rod 10 occurs in the rod thickness direction and the rod transverse direction. However, in the present embodiment, the mass portion 62 of the dynamic absorber 60 provided at the connecting rod 10 vibrates in the rod thickness direction with the phase substantially opposite to that of the bending vibration of the connecting rod 10 in the rod thickness direction. This reduces the bending vibration in the rod thickness direction, and noise due to such vibration can be reduced.

Advantageous Effects

As described above, according to the present embodiment, the dynamic absorber 60 is provided on the one end surface of the connecting portion 10c of the connecting rod 10 in the rod thickness direction. Thus, the bending vibration (particularly, vibration with about 1.2 kHz) of the connecting rod 10 in the thickness direction thereof can be reduced.

Note that in the present embodiment, the single dynamic absorber 60 is provided on the one end surface of the connecting portion 10c of the connecting rod 10 in the rod thickness direction, but the present invention is not limited to the single dynamic absorber 60.

The dynamic absorber 60 may be provided on each end surface in the rod thickness direction. Note that the single dynamic absorber 60 is preferably provided on the one end surface in the rod thickness direction, considering, e.g., a space.

Third Example Embodiment

The present embodiment is different from the first example embodiment in that a dynamic absorber 70 is provided on a side surface of a connecting portion 10c of a connecting rod 10 in the rod transverse direction to reduce bending vibration of the connecting rod 10 in the rod transverse direction. Other configuration of the present embodiment is similar to that of the first example embodiment. Thus, the same reference numerals as those of the first example embodiment are used to represent equivalent elements in the description made below.

Figure 11:
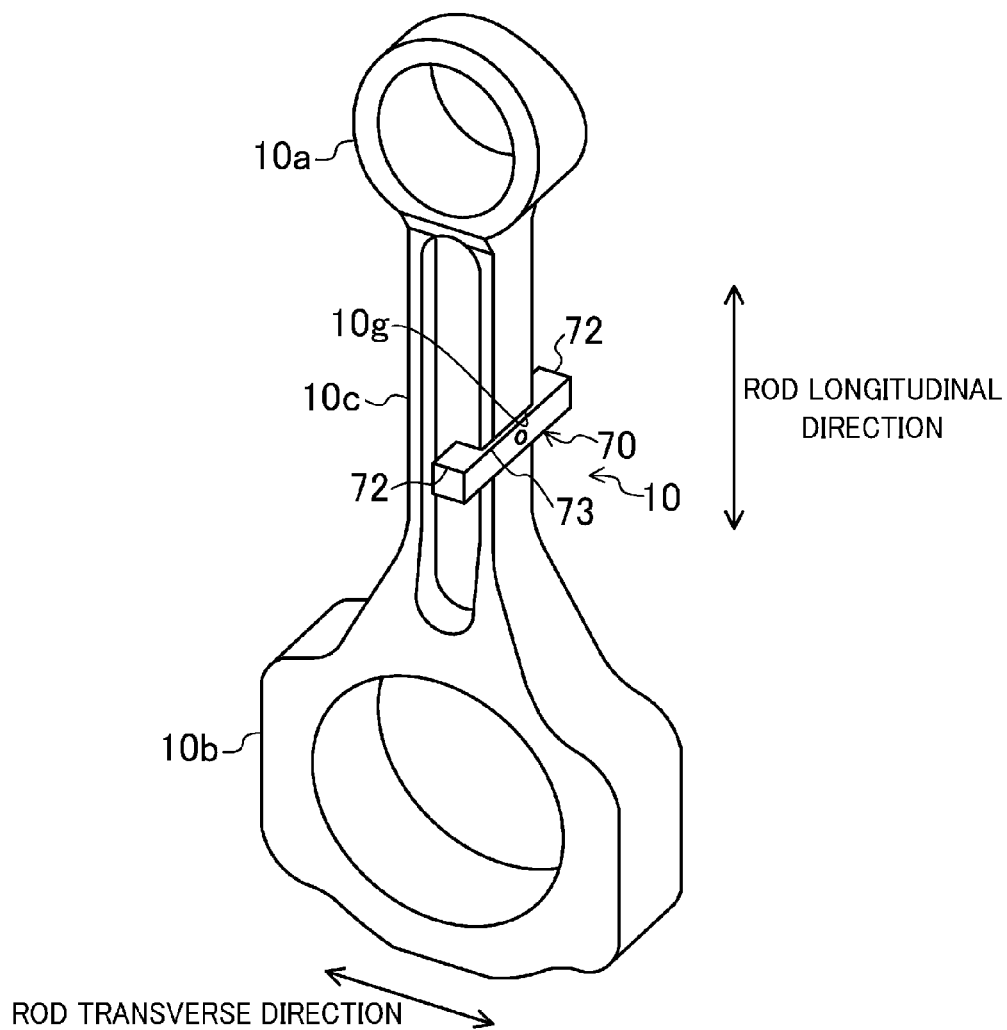
FIG. 11 is a schematic perspective view of a connecting rod in an engine employing a reciprocal rotation mechanism of a third example embodiment.
Figure 12:
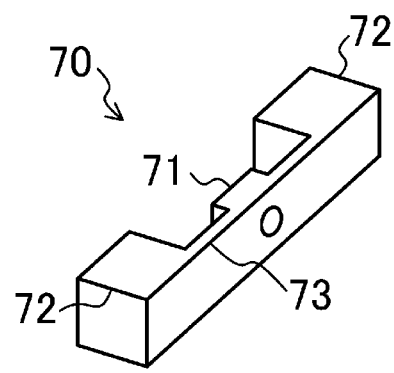
FIG. 12 is a perspective view of a dynamic absorber.

As illustrated in FIGS. 11 and 12, the dynamic absorber 70 configured to reduce, while an engine is operating, the bending vibration (particularly, vibration with a frequency of about 1.3 kHz or a frequency of about 2.4 kHz) of the connecting rod 10 in the rod transverse direction in association with vibration of a piston 1 in the rod longitudinal direction is provided on one end surface of the connecting portion 10c of the connecting rod 10 in the rod transverse direction.

The dynamic absorber 70 includes a fixed portion 71 fixed to the one end surface of the connecting portion 10c of the connecting rod 10 in the rod transverse direction, a pair of mass portions 72, and a support 73 supporting the mass portions 72 on the fixed portion 71 so that the mass portions 72 can vibrate in the rod transverse direction.

In the present embodiment, the fixed portion 71, the mass portions 72, and the support 73 in the dynamic absorber 70 are integrally made of metal. The fixed portion 71 of the dynamic absorber 70 is provided in the middle of the support 73 of the dynamic absorber 70 in the rod thickness direction. The fixed portion 71 is in a rectangular parallelepiped shape. On the one side surface of the connecting portion 10c of the connecting rod 10 in the rod transverse direction, the fixed portion 71 is positioned in the middle in the rod longitudinal direction. The fixed portion 71 is, with a fastening member (not shown), fastened and fixed to a recessed portion 10g formed at the one end surface of the connecting portion 10c of the connecting rod 10 in the rod transverse direction. The mass portions 72 of the dynamic absorber 70 are, via the support 73, provided on the outer surface of the fixed portion 71 in the rod transverse direction.

Each mass portion 72 of the dynamic absorber 70 is in a rectangular parallelepiped shape. The mass portions 72 are provided respectively at both end portions of the support 73 in the rod thickness direction. Theses two mass portions 72 are positioned outside of the connecting portion 10c of the connecting rod 10 in the rod thickness direction. The support 73 of the dynamic absorber 70 is provided on the outer surfaces of the mass portions 72 in the rod transverse direction.

The support 73 of the dynamic absorber 70 is in a rectangular plate shape extending in the rod thickness direction to connect between each mass portion 72 and the fixed portion 71 in the dynamic absorber 70. A clearance is formed between the inner surface of the support 73 in the rod transverse direction and the bottom surface of the recessed portion 10g at the one end surface of the connecting portion 10c of the connecting rod 10 in the rod transverse direction. The support 73 supports the mass portions 72 on the fixed portion 71 so that the mass portions 72 can vibrate in the rod transverse direction.

The support 73 of the dynamic absorber 70 corresponds to a spring supporting the mass portions 72, and the dimensions of each mass portion 72 and the dimensions of the support 73 are set such that the above-described bending vibration is reduced. Strictly speaking, the mass of the support 73 should be taken into consideration, the mass of the support 73 is much less than that of each mass portion 72, and therefore, the mass of the support 73 can be ignored.

As described above, when the piston 1 resonates on the connecting rod 10, the tendency shows that bending vibration of the connecting rod 10 occurs in the rod thickness direction and the rod transverse direction. However, in the present embodiment, each mass portion 72 of the dynamic absorber 70 provided at the connecting rod 10 vibrates in the rod transverse direction with the phase substantially opposite to that of the bending vibration of the connecting rod 10 in the rod transverse direction. This reduces the bending vibration in the rod transverse direction, and noise due to such vibration can be reduced.

Advantageous Effects

As described above, according to the present embodiment, the dynamic absorber 70 is provided on the one end surface of the connecting portion 10c of the connecting rod 10 in the rod transverse direction. Thus, the bending vibration (particularly, vibration with a frequency of about 1.3 kHz or a frequency of about 2.4 kHz) of the connecting rod 10 in the transverse direction thereof can be reduced.

Note that in the present embodiment, only the single dynamic absorber 70 is provided on the one end surface of the connecting portion 10c of the connecting rod 10 in the rod transverse direction, but the present invention is not limited to the single dynamic absorber 70. The dynamic absorber 70 may be provided on each end surface in the rod transverse direction. Note that the single dynamic absorber 70 is preferably provided on the one end surface in the rod transverse direction, considering, e.g., a space.

Fourth Example Embodiment

The present embodiment is different from the second example embodiment in the configuration of a dynamic absorber 80. Other configuration of the present embodiment is similar to that of the second example embodiment. Thus, the same reference numerals as those of the second example embodiment are used to represent equivalent elements in the description made below.

Figure 13:
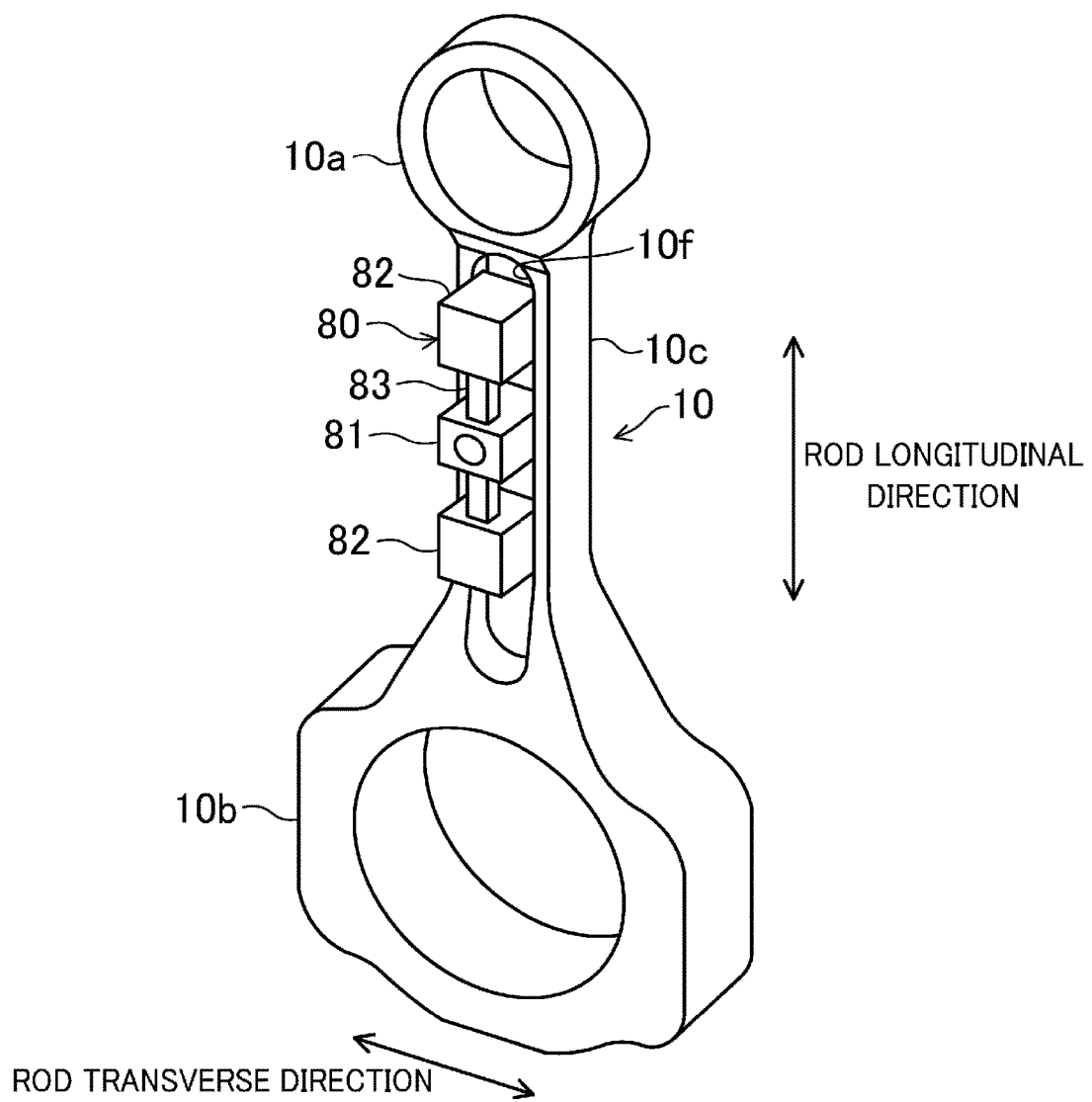
FIG. 13 is a schematic perspective view of a connecting rod in an engine employing a reciprocal rotation mechanism of a fourth example embodiment.
Figure 14:
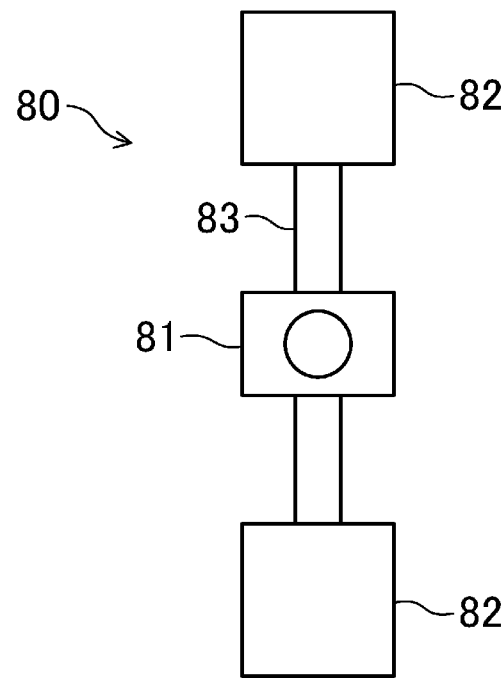
FIG. 14 is front view of a dynamic absorber.
Figure 15:
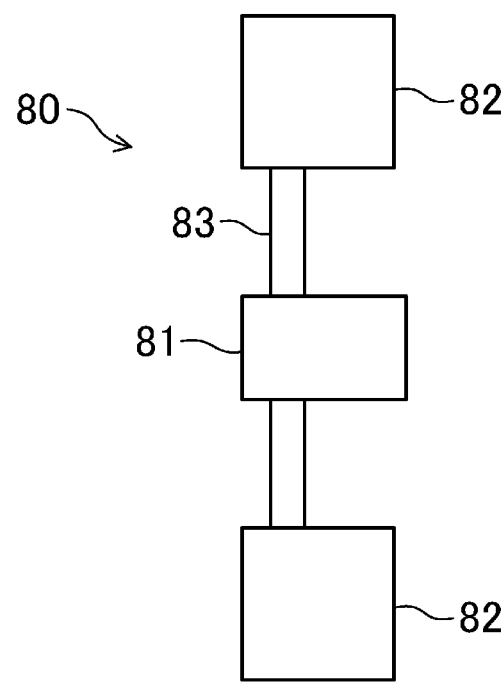
FIG. 15 is a side view of the dynamic absorber.

As illustrated in FIGS. 13 and 14, the dynamic absorber 80 configured to reduce, while an engine is operating, bending vibration (particularly, vibration with a frequency of about 1.2 kHz) of a connecting rod 10 in the rod thickness direction in association with vibration of a piston 1 in the rod longitudinal direction is provided on one end surface of a connecting portion 10c of the connecting rod 10 in the rod thickness direction.

The dynamic absorber 80 includes a fixed portion 81 fixed to the one end surface of the connecting portion 10c of the connecting rod 10 in the rod thickness direction, a pair of mass portions 82 provided in the vicinity of the one end surface of the connecting portion 10c of the connecting rod 10 in the rod thickness direction, and a support 83 supporting the mass portions 82 on the fixed portion 81 so that the mass portions 82 can vibrate in the rod thickness direction.

In the present embodiment, the fixed portion 81, the mass portions 82, and the support 83 in the dynamic absorber 80 are integrally made of metal. The fixed portion 81 of the dynamic absorber 80 is provided in the middle of the support 83 of the dynamic absorber 80 in the rod longitudinal direction. The fixed portion 81 is in a rectangular parallelepiped shape. The fixed portion 81 is, with a fastening member (not shown), fastened and fixed to a recessed portion 10f formed at the one end surface of the connecting portion 10c of the connecting rod 10 in the rod thickness direction. The mass portions 82 of the dynamic absorber 80 are provided on the fixed portion 81 via the support 83.

Each mass portion 82 of the dynamic absorber 80 is in a rectangular parallelepiped shape. The support 83 of the dynamic absorber 80 is provided at outer end portions of the mass portions 82 in the rod thickness direction and an outer end portion of the fixed portion 81 in the rod thickness direction. A clearance is formed between the inner surface of each mass portion 82 in the rod thickness direction and the bottom surface of the recessed portion 10f at the one end surface of the connecting portion 10c of the connecting rod 10 in the rod thickness direction.

The support 83 of the dynamic absorber 80 is in a rectangular plate shape extending in the rod longitudinal direction to connect between each mass portion 82 and the fixed portion 81 in the dynamic absorber 80. A clearance is formed between the inner surface of the support 83 in the rod thickness direction and the bottom surface of the recessed portion 10f at the one end surface of the connecting portion 10c of the connecting rod 10 in the rod thickness direction. The support 83 supports the mass portions 82 on the fixed portion 81 so that the mass portions 82 can vibrate in the rod thickness direction.

The support 83 of the dynamic absorber 80 corresponds to a spring supporting the mass portions 82, and the dimensions of each mass portion 82 and the dimensions of the support 83 are set such that the above-described bending vibration is reduced. Strictly speaking, the mass of the support 83 should be taken into consideration, the mass of the support 83 is much less than that of each mass portion 82, and therefore, the mass of the support 83 can be ignored.

As described above, when the piston 1 resonates on the connecting rod 10, the tendency shows that bending vibration of the connecting rod 10 occurs in the rod thickness direction and the rod transverse direction. However, in the present embodiment, each mass portion 82 of the dynamic absorber 80 provided at the connecting rod 10 vibrates in the rod thickness direction with the phase substantially opposite to that of the bending vibration of the connecting rod 10 in the rod thickness direction. This reduces the bending vibration in the rod thickness direction, and noise due to such vibration can be reduced.

Advantageous Effects

As described above, according to the present embodiment, the dynamic absorber 80 is provided on the one end surface of the connecting portion 10c of the connecting rod 10 in the rod thickness direction. Thus, the bending vibration (particularly, vibration with about 1.2 kHz) of the connecting rod 10 in the thickness direction thereof can be reduced.

Note that in the present embodiment, only the single dynamic absorber 80 is provided on the one end surface of the connecting portion 10c of the connecting rod 10 in the rod thickness direction, but the present invention is not limited to the single dynamic absorber 80. The dynamic absorber 80 may be provided on each end surface in the rod thickness direction. Note that the single dynamic absorber 80 is preferably provided on the one end surface in the rod thickness direction, considering, e.g., a space.

Example

In each of the above-described example embodiments, the effect of reducing bending vibration of the connecting rod 10 in the thickness or transverse direction thereof was analyzed.

Analysis conditions were as follows. That is, an analysis model (a calculation model) was an inline-four engine including components (pistons, connecting rods, a crank shaft, a crank pulley, a fly wheel, a cylinder head, and a cylinder block).

In the first example embodiment, the weight of each mass portion 52 of the dynamic absorber 50 was 0.032 kg, and the spring constant of the support 53 in the bending vibration direction thereof was $1.9 \times 10^6$ N/m. In the second example embodiment, the weight of the mass portion 62 of the dynamic absorber 60 was 0.020 kg, and the spring constant of the support 63 in the bending vibration direction thereof was $1.1 \times 10^6$ N/m. In the third example embodiment, the weight of each mass portion 72 of the dynamic absorber 70 was 0.010 kg, and the spring constant of the support 73 in the bending vibration direction thereof was $0.6 \times 10^6$ N/m. In the fourth example embodiment, the weight of each mass portion 82 of the dynamic absorber 80 was 0.010 kg, and the spring constant of the support 83 in the bending vibration direction thereof was $0.6 \times 10^6$ N/m.

In the first, second, and fourth example embodiments, vibration in the rod thickness direction (the axial direction of the crank shaft 3) was applied to the substantially middle between the small end portion 10a and the large end portion 10b in the connecting rod 10 of the fourth cylinder. The characteristics of the vibration in the rod thickness direction was analyzed.

A typical example where no dynamic absorber is attached to the connecting rod 10 was prepared as a comparative example of the first, second, and fourth example embodiments. As in the first, second, and fourth example embodiments, vibration in the rod thickness direction was applied to the substantially middle between the small end portion 10a and the large end portion 10b in the connecting rod 10 of the fourth cylinder. The characteristics of the vibration in the rod thickness direction was analyzed.

In the third example embodiment, vibration in the rod transverse direction (the direction perpendicular to the axial direction of the crank shaft 3) was applied to the substantially middle between the small end portion 10a and the large end portion 10b in the connecting rod 10 of the fourth cylinder. The characteristics of the vibration in the rod transverse direction was analyzed.

A typical example where no dynamic absorber is attached to the connecting rod 10 was prepared as a comparative example of the third example embodiment. As in the third example embodiment, vibration in the rod transverse direction was applied to the substantially middle between the small end portion 10a and the large end portion 10b in the connecting rod 10 of the fourth cylinder. The characteristics of the vibration in the rod transverse direction was analyzed.

Figure 16:
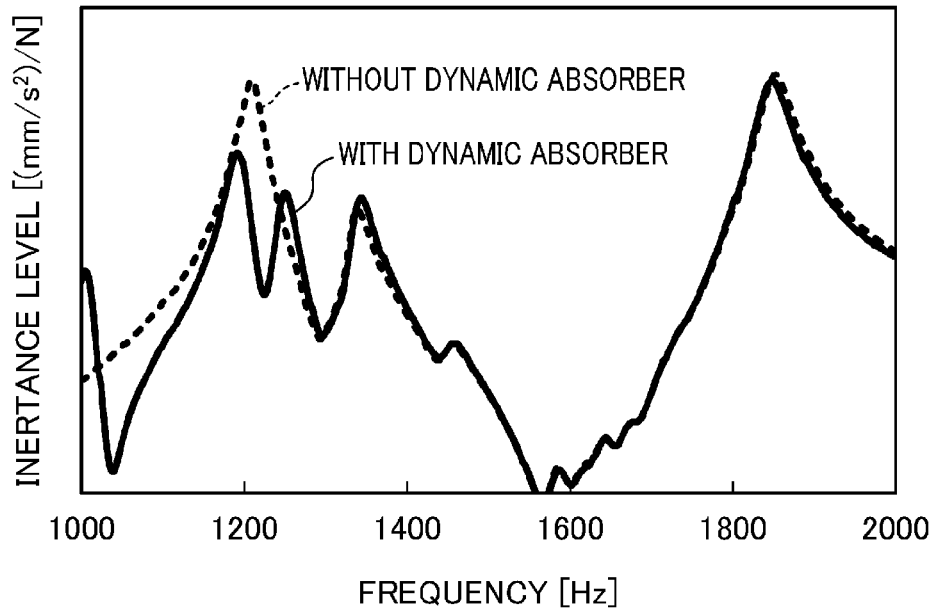
FIG. 16 is a graph of analysis results of vibration characteristics of the first example embodiment and a comparative example where no dynamic absorber is attached to a connecting rod.

FIG. 16 is a graph of the analysis results of the vibration characteristics of the first example embodiment and the comparative example. The horizontal axis of FIG. 16 represents the frequency [Hz] of the vibration, and the vertical axis of FIG. 16 represents an inertance level $[(mm/s^2)/N]$ (the same applies to FIGS. 17 to 19 described later). A solid line of FIG. 16 represents the vibration characteristics of the example embodiment, and a dashed line of FIG. 16 represents the vibration characteristics of the comparative example (the same applies to FIGS. 17 to 19 described later). According to FIG. 16, it has been found that vibration with about 1.2 kHz can be more reduced in the first example embodiment as compared to the typical example where no dynamic absorber is attached.

Figure 17:
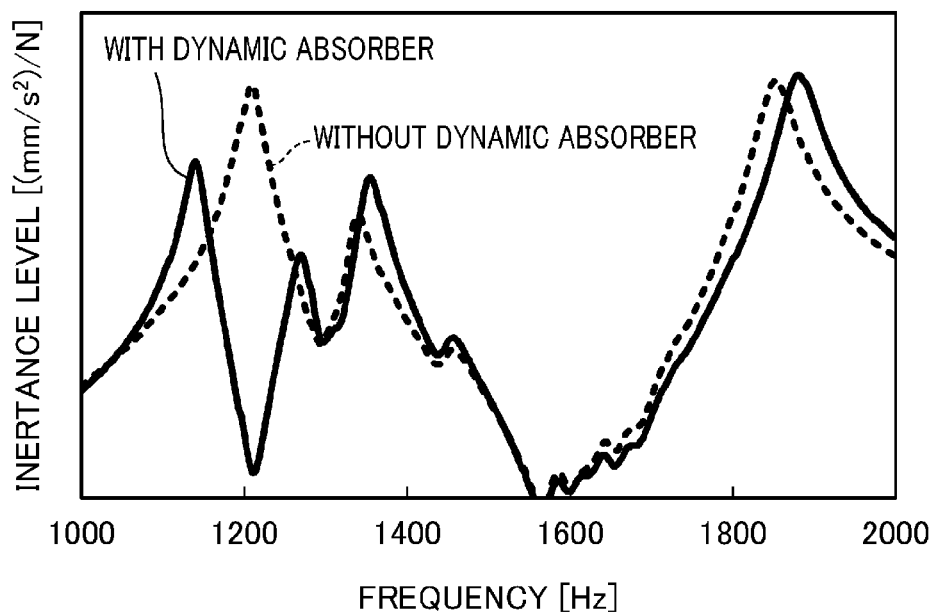
FIG. 17 is a graph of analysis results of vibration characteristics of the second example embodiment and the comparative example where no dynamic absorber is attached to the connecting rod.

FIG. 17 is a graph of the analysis results of the vibration characteristics of the second example embodiment and the comparative example. According to FIG. 17, it has been found that vibration with about 1.2 kHz can be more reduced in the second example embodiment as compared to the typical example where no dynamic absorber is attached.

Figure 18:
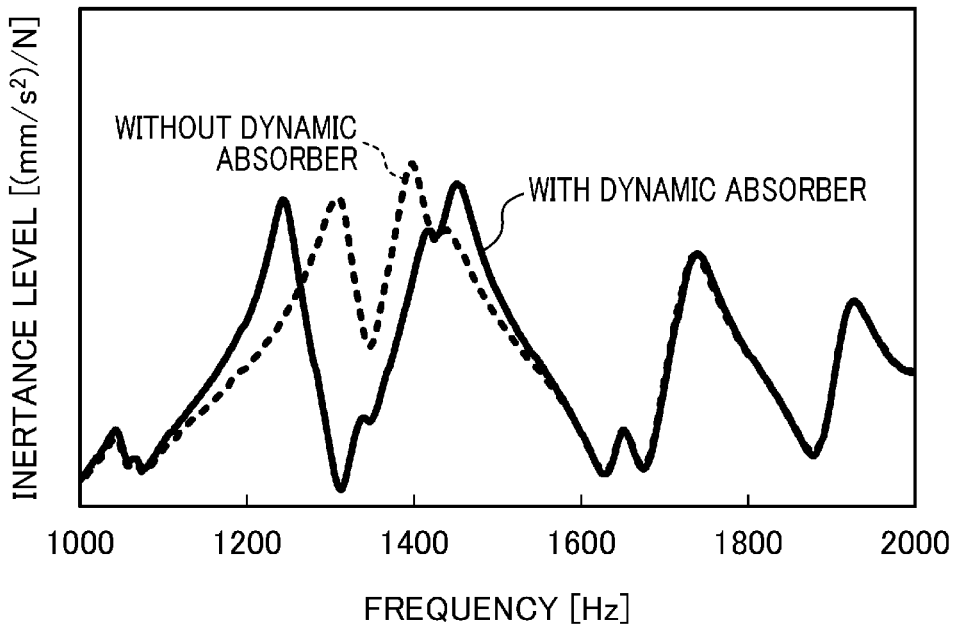
FIG. 18 is a graph of analysis results of vibration characteristics of the third example embodiment and a comparative example where no dynamic absorber is attached to a connecting rod.

FIG. 18 is a graph of the analysis results of the vibration characteristics of the third example embodiment and the comparative example. According to FIG. 18, it has been found that vibration with about 1.3 kHz can be more reduced in the third example embodiment as compared to the typical example where no dynamic absorber is attached.

Figure 19:
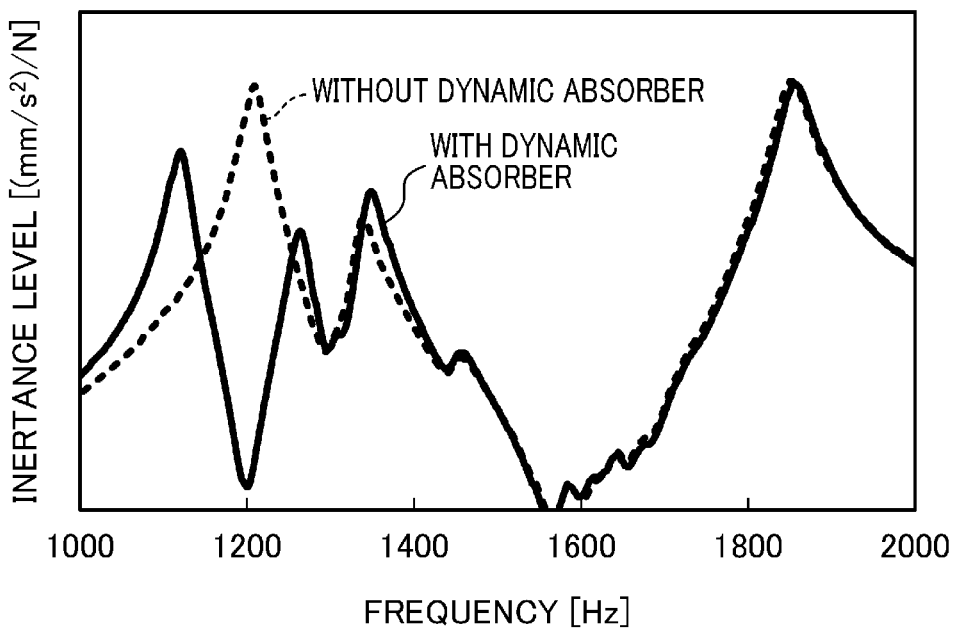
FIG. 19 is a graph of analysis results of vibration characteristics of the fourth example embodiment and the comparative example where no dynamic absorber is attached to the connecting rod.

FIG. 19 is a graph of the analysis results of the vibration characteristics of the fourth example embodiment and the comparative example. According to FIG. 19, it has been found that vibration with about 1.2 kHz can be more reduced in the fourth example embodiment as compared to the typical example where no dynamic absorber is attached.

Other Embodiments

The components of the above-described example embodiments may be optionally combined together. For example, in order to reduce the bending vibration of the connecting rod 10 in the rod thickness direction and the rod transverse direction, the dynamic absorber 50 of the first example embodiment, the dynamic absorber 60 of the second example embodiment, or the dynamic absorber 80 of the fourth example embodiment may be provided together with the dynamic absorber 70 of the third example embodiment.

In the second example embodiment, in order to reduce the bending vibration of the connecting rod 10 in the rod thickness direction, the dynamic absorber 70 (see FIGS. 11 and 12) of the third example embodiment may be provided instead of the dynamic absorber 60. In this case, although not shown in the figure, the fixed portion 71 of the dynamic absorber 70 is, via the fastening member, fastened and fixed to an upper end portion of the connecting portion 10c of the connecting rod 10 in the rod longitudinal direction at the one end surface of the connecting portion 10c of the connecting rod 10 in the rod thickness direction. The support 73 of the dynamic absorber 70 supports the mass portions 72 on the fixed portion 71 so that the mass portions 72 can vibrate in the rod thickness direction. The support 73 extends in the rod transverse direction.

INDUSTRIAL APPLICABILITY

As described above, the technique disclosed in the present specification is applicable to, e.g., a reciprocal rotation mechanism of an engine requiring reduction in bending vibration of a connecting rod.

DESCRIPTION OF REFERENCE CHARACTERS (1) Piston
(1c) Boss Portion
(1d) Pin Support Hole
(2) Piston Pin
(3) Crank Shaft
(10) Connecting Rod
(10a) Small End Portion of Connecting Rod
(10b) Large End Portion of Connecting Rod
(10c) Connecting Portion of Connecting Rod
(10d) Pin Insertion Hole
(10e) Shaft Insertion Hole
(50), (60), (70), (80) Dynamic Absorber
(51), (61), (71), (81) Fixed Portion
(52), (62), (72), (82) Mass Portion
(53), (63), (73), (83) Support Portion

The invention claimed is:

1. A reciprocal rotation mechanism of an engine including a piston configured to reciprocate in a cylinder, and a connecting rod configured to connect between the piston and a crank shaft, in which the connecting rod includes a large end portion formed with a shaft insertion hole into which the crank shaft is inserted, a small end portion formed with a pin insertion hole into which a piston pin for connection of the piston is inserted, and a connecting portion configured to connect both of the large end portion and the small end portion, the reciprocal rotation mechanism comprising:
 another connecting portion provided on a support which is provided on the piston in a thickness direction of the connecting rod;
 a dynamic absorber provided on a side surface of the another connecting portion in the thickness direction of the connecting rod;
 a mass portion of the dynamic absorber provided on the piston while forming a clearance between the support and the mass portion via the another connecting portion to thereby reduce bending vibration of the connecting rod in the thickness direction of the connecting rod; and
 wherein the mass portion and the another connecting portion are integrally made.

2. The reciprocal rotation mechanism of claim 1, wherein a boss portion formed with a pin support hole at which the piston pin is supported is formed at each end portion of the piston in a center axis direction of the piston pin, and
 the dynamic absorber is provided on an outer surface of each boss portion in the center axis direction of the piston pin.

3. The reciprocal rotation mechanism of claim 1, wherein the support, the another connecting portion, and the mass portion of the dynamic absorber are integrally made.

4. A reciprocal rotation mechanism of an engine including a piston configured to reciprocate in a cylinder, and a connecting rod configured to connect between the piston and a crank shaft, in which the connecting rod includes a large end portion formed with a shaft insertion hole into which the crank shaft is inserted, a small end portion formed with a pin insertion hole into which a piston pin for connection of the piston is inserted, and a connecting portion configured to connect both of the large end portion and the small end portion, the reciprocal rotation mechanism comprising:
 another connecting portion provided on a support which is provided on the piston in a thickness direction of the connecting rod;
 a dynamic absorber to reduce bending vibration of the connecting rod in the thickness direction of the connecting rod provided on a side surface of the another connecting portion in a thickness direction of the connecting rod;
 a mass portion of the dynamic absorber provided on the piston while forming a clearance between the support and the mass portion via the another connecting portion to thereby reduce bending vibration of the connecting rod; and
 wherein the mass portion and the another connecting portion are integrally made.

5. The reciprocal rotation mechanism of claim 4, wherein the support, the another connecting portion, and the mass portion of the dynamic absorber are integrally made.

* * * * *